(12) United States Patent
Fukushima

(10) Patent No.: US 9,013,740 B2
(45) Date of Patent: Apr. 21, 2015

(54) INFORMATION PROCESSING APPARATUS, CONTROL METHOD THEREFOR AND COMPUTER-READABLE STORAGE MEDIUM

(71) Applicant: Canon Kabushiki Kaisha, Tokyo (JP)

(72) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/666,772

(22) Filed: Nov. 1, 2012

(65) Prior Publication Data

US 2013/0120791 A1   May 16, 2013

(30) Foreign Application Priority Data

Nov. 14, 2011  (JP) ................................. 2011-249071

(51) Int. Cl.
*G06K 15/02* (2006.01)
*H04N 1/00* (2006.01)
*H04N 1/32* (2006.01)
*H04N 1/44* (2006.01)

(52) U.S. Cl.
CPC ....... *H04N 1/00411* (2013.01); *H04N 1/00424* (2013.01); *H04N 1/00474* (2013.01); *H04N 1/00511* (2013.01); *H04N 1/00514* (2013.01); *H04N 1/32037* (2013.01); *H04N 1/4413* (2013.01); *H04N 1/4433* (2013.01); *H04N 2201/0094* (2013.01)

(58) Field of Classification Search
USPC ........................ 713/166; 358/1.15, 1.16, 1.18
See application file for complete search history.

(56) References Cited

U.S. PATENT DOCUMENTS

| | | | | |
|---|---|---|---|---|
| 7,865,942 B2 * | 1/2011 | Mimura et al. | ................... | 726/6 |
| 8,218,179 B2 * | 7/2012 | Nakajima | .................... | 358/1.15 |
| 2003/0083903 A1 * | 5/2003 | Myers | ................. | 705/2 |
| 2003/0135761 A1 * | 7/2003 | Mimura et al. | ............... | 713/201 |
| 2006/0070070 A1 * | 3/2006 | Iwamoto et al. | .............. | 718/100 |
| 2006/0282673 A1 * | 12/2006 | Lee | ................. | 713/176 |
| 2008/0209158 A1 * | 8/2008 | Asano et al. | .................. | 711/173 |
| 2008/0235434 A1 | 9/2008 | Eun et al. | ...................... | 711/101 |
| 2010/0263054 A1 | 10/2010 | Kasahara | ........................ | 726/26 |
| 2011/0083012 A1 * | 4/2011 | Choi | ............................. | 713/166 |
| 2011/0149332 A1 * | 6/2011 | Cho | ............................. | 358/1.14 |
| 2011/0181902 A1 * | 7/2011 | Chiba et al. | ................... | 358/1.13 |
| 2012/0154413 A1 * | 6/2012 | Kim et al. | ...................... | 345/530 |
| 2012/0215621 A1 * | 8/2012 | Heffernan et al. | ......... | 705/14.41 |
| 2012/0327465 A1 * | 12/2012 | Yamada | ........................ | 358/1.15 |
| 2013/0074117 A1 * | 3/2013 | Song et al. | ...................... | 725/31 |

FOREIGN PATENT DOCUMENTS

| | | | | |
|---|---|---|---|---|
| CN | 101272431 A | 9/2008 | .............. | H04N 1/00 |
| JP | 2007-228346 A | 9/2007 | | |

\* cited by examiner

*Primary Examiner* — Jerome Grant, II
(74) *Attorney, Agent, or Firm* — Fitzpatrick, Cella, Harper & Scinto

(57) ABSTRACT

This invention provides a mechanism which improves the operability by speeding up an operation of displaying a personal address book. To accomplish this, an information processing apparatus manages a plurality of transmit destinations by classifying the plurality of transmit destinations into a plurality of first transmit destination groups individually for respective users, and a second transmit destination group shared by a plurality of users, and displays on a display unit a list of transmit destinations included in a first transmit destination group corresponding to an authenticated user if an authentication function is valid, and displays on the display unit a list of transmit destinations included in the second transmit destination group if the authentication function is invalid.

12 Claims, 13 Drawing Sheets

FIG. 3

I WILL PRESENT THIS
DESTINATION TO PUBLIC   ☑

I WILL VEST CHANGE AUTHORITY   ☐

I WILL PRESENT THIS DESTINATION TO FOLLOWING USERS

| USER A | RW |
| USER B | RO |

ADD USER

DELETE USER

CHANGE AUTHORITY

INFORMATION PROCESSING APPARATUS, CONTROL METHOD THEREFOR AND COMPUTER-READABLE STORAGE MEDIUM

BACKGROUND OF THE INVENTION

1. Field of the Invention

The present invention relates to an information processing apparatus, a control method therefor, and a computer-readable storage medium.

2. Description of the Related Art

An image processing apparatus such as a digital multifunction peripheral has a function of digitizing a scanned document and transmitting the digital document to an arbitrary transmit destination via e-mail, and a function of transmitting the digital document by file transmission (for example, SMB transmission). Also, in terms of operability, it is undesirable to input transmit destination information (for example, the server name, user name, and password) every time a digital document is to be transmitted. Hence, the current image processing apparatus adopts a configuration which easily transmits a digital document only by registering a transmit destination in an address book inside the image processing apparatus in advance, and selecting the transmit destination from the address book before transmission. The image processing apparatus is shared by a plurality of users, and therefore allows them to register their personal address books, thereby further improving the operability. Japanese Patent Laid-Open No. 2007-228346, for example, proposes a method of improving the operability by registering search conditions for an address book that each individual person uses frequently.

However, the above-mentioned related art technique has the following problem. In the related art technique, when the user displays his or her personal address book, he or she must check all registered transmit destinations to determine whether they are associated with him or her, so it takes much time to display that address book. Therefore, it takes a considerable time for the user to search his or her personal address book for a given transmit destination, leading to low operability.

SUMMARY OF THE INVENTION

The present invention enables realization of a mechanism which improves the operability by speeding up an operation of displaying a personal address book.

One aspect of the present invention provides an information processing apparatus comprising: a management unit that stores in a storage unit a transmit destination to which data is to be transmitted from the information processing apparatus, and manages a plurality of transmit destinations stored in the storage unit by classifying the plurality of transmit destinations into a plurality of first transmit destination groups individually for respective users, and a second transmit destination group shared by a plurality of users; a determination unit that determines whether or not an authentication function of authenticating a user who operates the information processing apparatus is valid; an authentication unit that authenticates the user if the authentication function is valid; and a display control unit that displays on a display unit a list of transmit destinations included in a first transmit destination group corresponding to the user authenticated by the authentication unit if the authentication function is valid, and displays on the display unit a list of transmit destinations included in the second transmit destination group if the authentication function is invalid.

Another aspect of the present invention provides a control method for an information processing apparatus, the method comprising: causing a management unit to execute a management step of storing in a storage unit a transmit destination to which data is to be transmitted from the information processing apparatus, and managing a plurality of transmit destinations stored in the storage unit by classifying the plurality of transmit destinations into a plurality of first transmit destination groups individually for respective users, and a second transmit destination group shared by a plurality of users; causing a determination unit to execute a determination step of determining whether or not an authentication function of authenticating a user who operates the information processing apparatus is valid; causing an authentication unit to execute an authentication step of authenticating the user if the authentication function is valid; and causing a display control unit to execute a display control step of displaying on a display unit a list of transmit destinations included in a first transmit destination group corresponding to the user authenticated by the authentication unit if the authentication function is valid, and displaying on the display unit a list of transmit destinations included in the second transmit destination group if the authentication function is invalid.

Still another aspect of the present invention provides a computer-readable storage medium storing a computer program for causing a computer to execute each step in a control method for the information processing apparatus.

Further features of the present invention will become apparent from the following description of exemplary embodiments with reference to the attached drawings.

BRIEF DESCRIPTION OF THE DRAWINGS

FIG. 3 is a view illustrating an example of a public setting screen on the MFP 110 according to the embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Configuration of Image Processing Apparatus>

Figure 1:
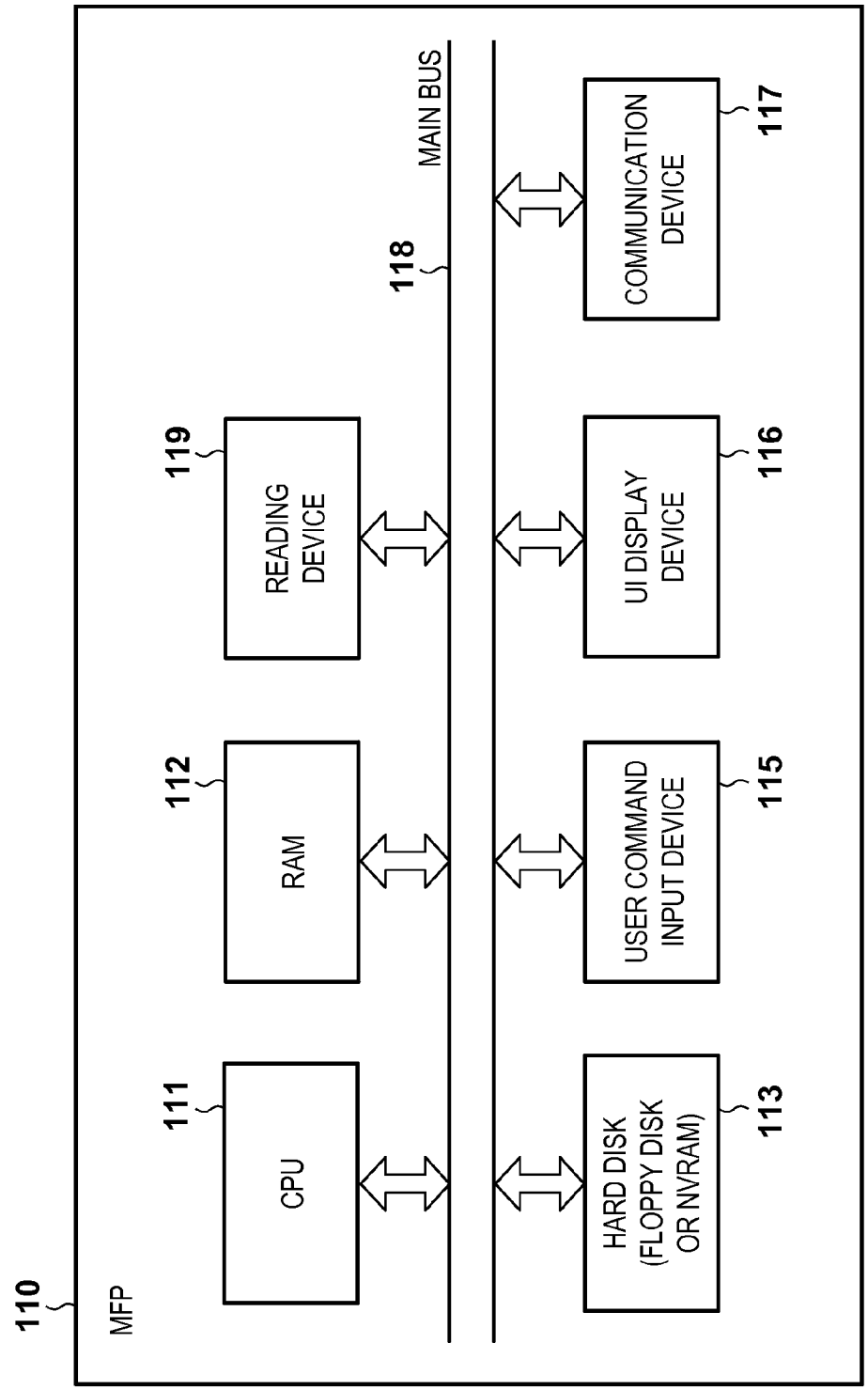
FIG. 1 is a block diagram for explaining the configuration of an MFP 110 according to an embodiment of the present invention.

An example of the equipment configuration of an MFP 110 serving as an image processing apparatus according to this embodiment will be described first with reference to FIG. 1. Although an MFP (MultiFunction Peripheral) will be taken as an example of an information processing apparatus herein, the present invention is applicable to any information processing apparatus which transmits data to an external device, and manages a transmit destination.

The MFP 110 includes a CPU 111, RAM 112, hard disk (to be abbreviated as an HDD hereinafter) 113, user command input device 115, UI display device 116, communication device 117, and reading device 119. These components can exchange data with each other upon being connected to each other via a main bus 118. The CPU 111 systematically controls the MFP 110. The RAM 112 provides a work area for the CPU 111. The HDD 113 is an NVRAM (it may also be, for example, a hard disk) which stores a control program and various settings.

The user command input device 115 is an interface for prompting the user (including a person who uses the apparatus and a person who installed the apparatus) to input a command. The UI display device 116 displays a screen. The reading device 119 reads an image on paper as electronic data. The communication device 117 communicates with an external device via a network.

Note that in the MFP 110 according to this embodiment, the CPU 111 controls the RAM 112, HDD 113, user command input device 115, UI display device 116, communication device 117, and reading device 119 via the main bus 118. In the MFP 110 according to this embodiment, the user stores transmit destinations in the HDD 113 in the form of an address book in advance. Further, the user can execute image transmission in the MFP 110 by selecting a transmit destination from the address book. According to this embodiment, the user can use both address books (first transmit destination groups) individually managed for respective users, and an address book (second transmit destination group) shared by a plurality of users.

<Transmit Destination Registration Process>

Figure 2A:
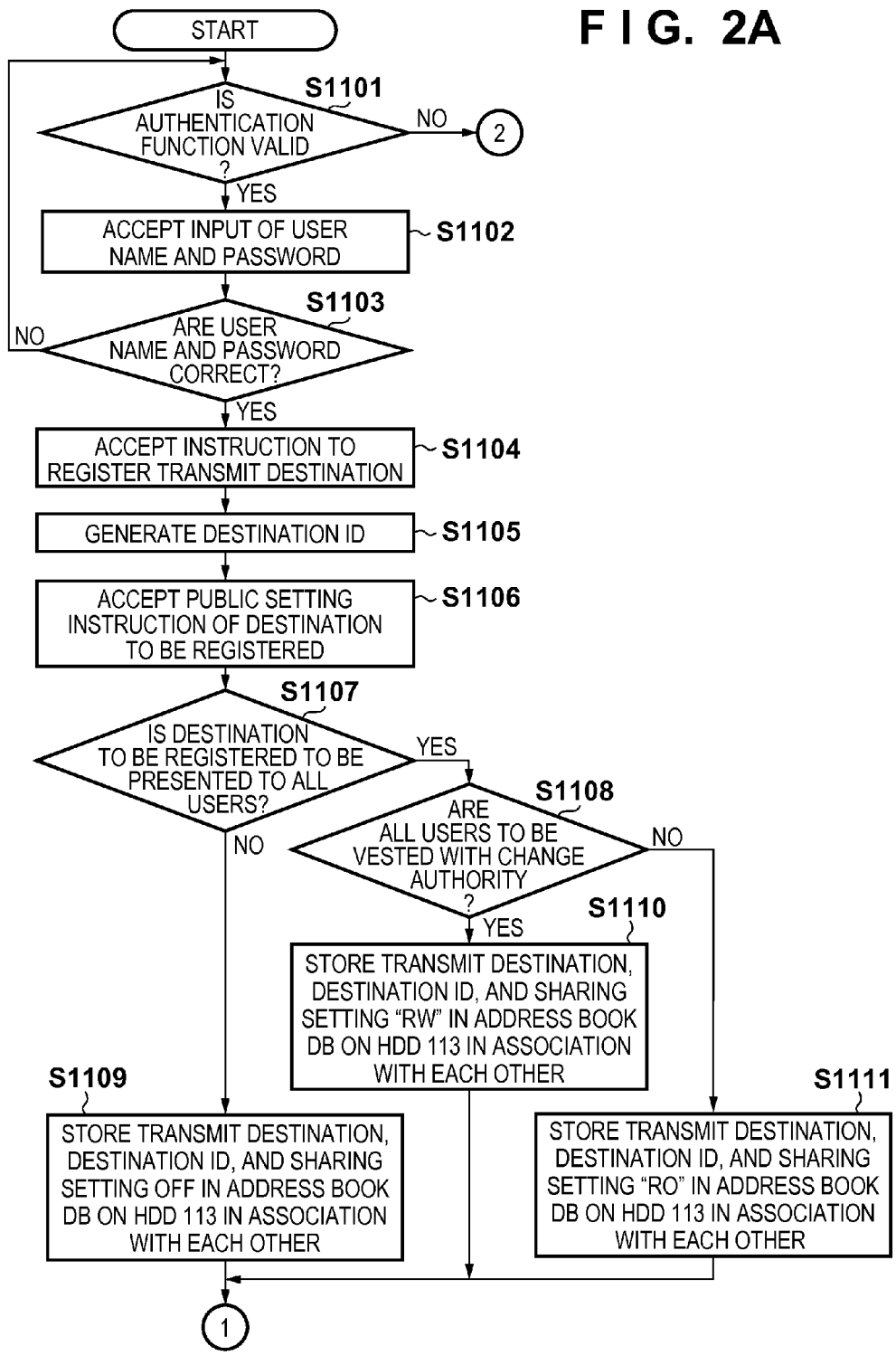
FIGS. 2A and 2B are flowcharts for explaining a destination registration operation by the MFP 110 according to the embodiment.
Figure 2B:
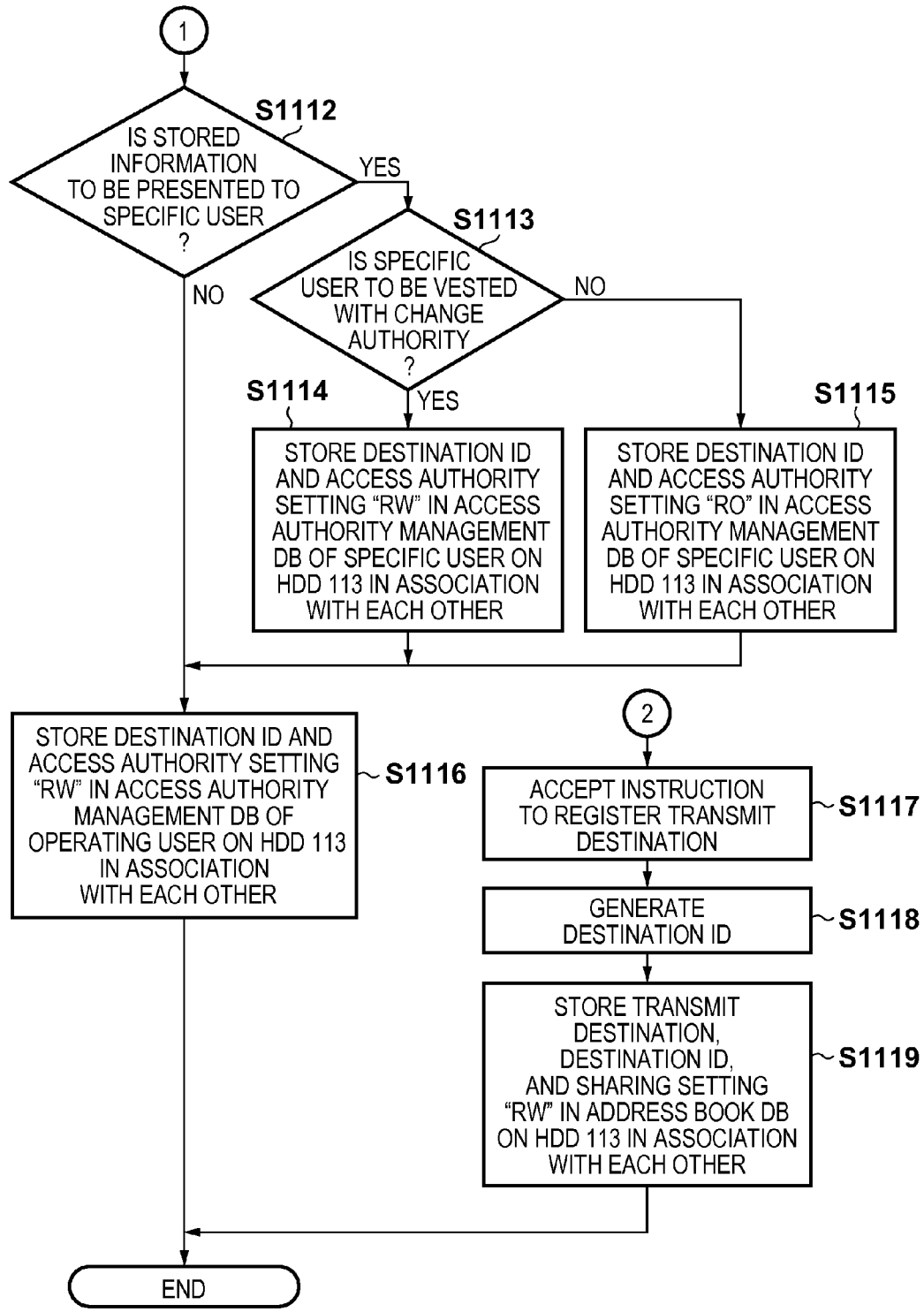

The operation of a transmit destination registration process by the MFP 110 in response to an instruction to register a transmit destination from the user will be described next with reference to FIGS. 2A and 2B. The CPU 111 of the MFP 110 executes and implements this flowchart in accordance with the program stored in the HDD 113. Note that the CPU 111 implements the following process by reading out the control program stored in the HDD 113 into the RAM 112, and executing it.

First, in step S1101, the CPU 111 reads out equipment settings stored in the HDD 113 to make the MFP 110 determine whether or not the authentication function is currently valid. In the mode in which the authentication function is valid, a user who can operate the MFP 110 is managed, so he or she can operate the MFP 110 only after authentication. On the other hand, in the mode in which the authentication function is invalid, all users can operate the MFP 110. These modes may independently be set for respective functions as: all users can use a copy function, and only an authenticated user can use an image transmission function. If YES is determined in step S1101, the process advances to step S1102; otherwise, the process advances to step S1116.

In step S1102, the CPU 111 displays a screen on the UI display device 116 to prompt the user to input the user name and password, and acquires a value input via the user command input device 115. In step S1103, the CPU 111 determines whether or not the acquired user name and password are correct. If YES is determined in step S1103, the process advances to step S1104; otherwise, the process returns to step S1101. Upon this determination operation, the user can be authenticated.

In step S1104, the CPU 111 accepts an instruction to register a transmit destination from the user command input device 115. Note that the CPU 111 acquires the user input value of data indicating an image transmit destination such as an e-mail destination, facsimile destination, or the address of a file sharing server. The CPU 111 also accepts an instruction to register, for example, the name and phonetic transcriptions in kana registered in an address book as supplementary information of the transmit destination information. Upon accepting an instruction to register a transmit destination, the CPU 111 generates a destination ID in step S1105. The destination ID generated at this time is a unique identifier to be assigned to the transmit destination to be registered. An identifier may be assigned sequentially from 0, or a general-purpose identifier such as a UUID (Universally Unique IDentifier) may be generated.

In step S1106, the CPU 111 accepts a public setting instruction of the transmit destination to be registered from the user command input device 115. This is done by setting whether all users other than the user who is currently performing a registration operation are to share the transmit destination to be registered, or whether a specific user is to be permitted to use this transmit destination. The CPU 111 also accepts input of information indicating whether each user is to be vested with change authority or only with access authority. FIG. 3 illustrates an example of a screen displayed on the UI display device 116 in step S1106. In the example shown in FIG. 3, setting for presenting the destination to be registered to all users is selected. When an item for vesting each user with change authority is further selected, all users can change the destination to be registered. Note that cancellation of this setting validates setting for presenting the destination to be registered to a specific user. In the example shown in FIG. 3, user A has both access and change authority, while user B has only access authority.

Figure 4:
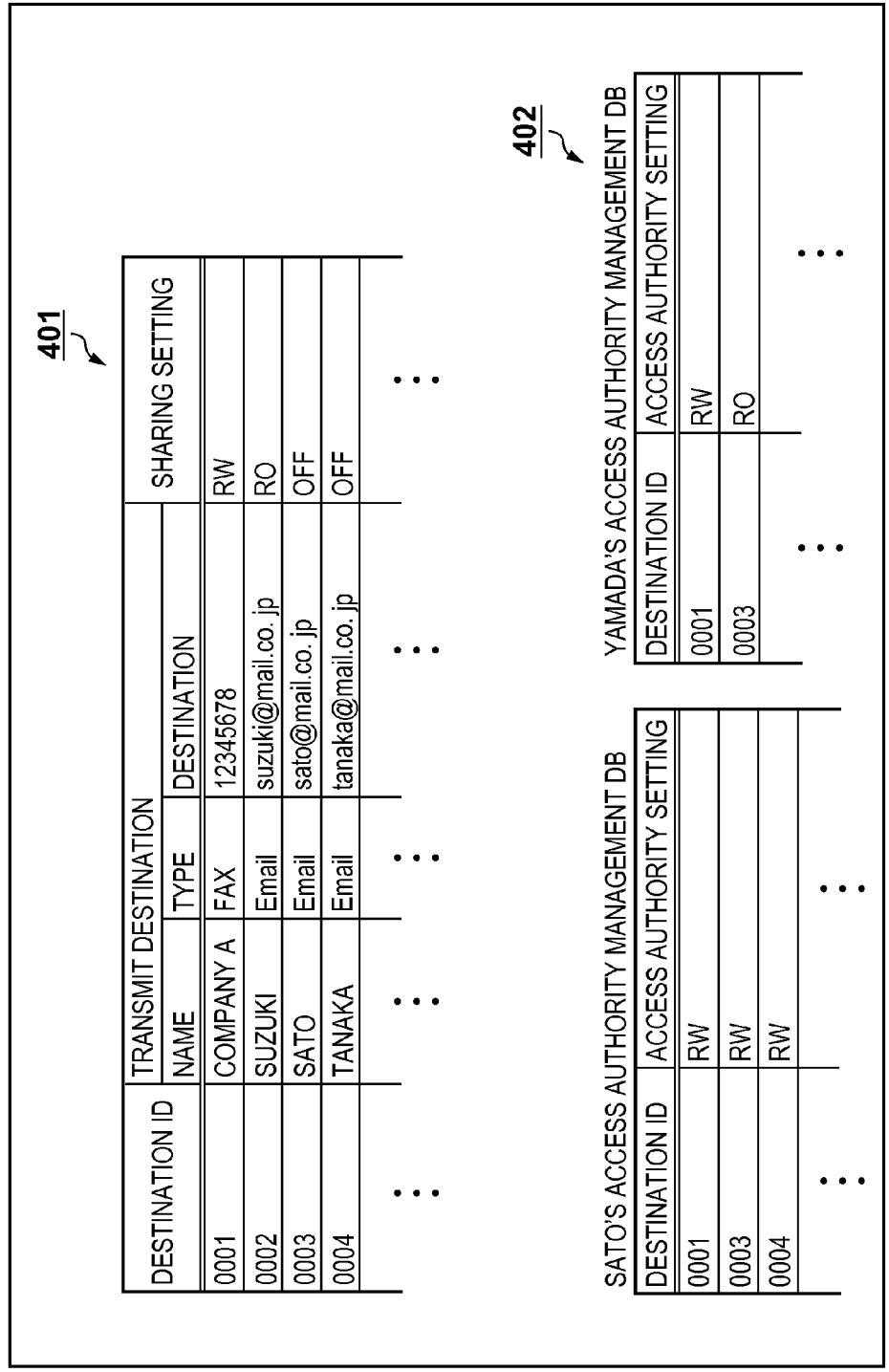
FIG. 4 is a table illustrating an example of the structure of an address book DB on the MFP 110 according to the embodiment.

Upon accepting the setting, first, the CPU 111 determines in step S1107 whether all users are to share the registration destination. If NO is determined in step S1107, the process advances to step S1109, in which the CPU 111 adds as one record the transmit destination input in step S1104, the destination ID generated in step S1105, and sharing setting information indicating sharing setting OFF to an address book DB stored on the HDD 113. The process then advances to step S1112. FIG. 4 illustrates an example of the structure of the address book DB. The destination ID, transmit destination, and sharing settings are stored in the address book in association with each other, as indicated by reference numeral 401 in FIG. 4. The transmit destination includes its name, type, and information. As the sharing settings, editing authority including "RW" (an abbreviation for "Read Write" authority) symbolizing authority for both access and change, "RO" (an abbreviation for "Read Only" authority) symbolizing authority for only access, and "OFF" symbolizing no authority is defined.

On the other hand, if YES is determined in step S1107, the process advances to step S1108, in which the CPU 111 determines whether all users are to be vested with change authority. If YES is determined in step S1108, the process advances to step S1110, in which the CPU 111 adds one record defining the transmit destination, destination ID, and sharing setting "RW" to the address book DB, and the process advances to step S1112. On the other hand, if NO is determined in step S1108, the process advances to step S1111, in which the CPU 111 adds one record defining the transmit destination, destination ID, and sharing setting "RO" to the address book DB, and the process advances to step S1112.

When the process of adding one record to the address book DB in step S1109, S1110, or S1111 ends, the CPU 111 determines in step S1112 whether the added record is to be presented to a specific user other than the operating user, in accordance with the value input in step S1106. If YES is determined in step S1112, the process advances to step S1113, in which the CPU 111 determines whether the specific user is to be vested with change authority. If YES is determined in step S1113, the process advances to step S1114, in which the CPU 111 adds as one record the destination ID generated in step S1105, and access authority setting "RW" to the access authority management DB of the specific user, which is stored on the HDD 113, and the process advances to step S1116. Reference numeral 402 in FIG. 4 shows an example of the structure of an access authority management DB for each individual user. Each access authority management DB has the structure of a user-specific list, which manages the destination IDs of transmit destinations that can be used by the corresponding user, and the authorities to access the transmit destinations.

On the other hand, if NO is determined in step S1113, the process advances to step S1115, in which the CPU 111 adds as one record the destination ID and access authority setting "RO" to the access authority management DB of the specific user, and the process advances to step S1116. The process for presenting the added record to a specific user in steps S1112, S1113, and S1114 or S1115 may be repeated for a plurality of users. Also, a process for presenting the added record not only to a specific user but also to a group of a plurality of users may be performed.

When the presentation process in step S1114 or S1115 ends, in step S1116 the CPU 111 adds as one record the destination ID and access authority setting "RW" to the access authority management DB of the operating user, and the process ends. Upon this operation, one record is added to a personal address book corresponding to the user who has performed the registration process.

On the other hand, if NO is determined in step S1101, the process advances to step S1117, in which the CPU 111 accepts an instruction to register a transmit destination, as in step S1104. In step S1118, the CPU 111 generates a destination ID, as in step S1105. Lastly, in step S1119, as in step S1110, the CPU 111 adds the transmit destination input in step S1117, the destination ID generated in step S1105, and sharing setting "RW" to the address book DB as one record, and ends the process.

<Transmit Destination Display Process>

Figure 5:
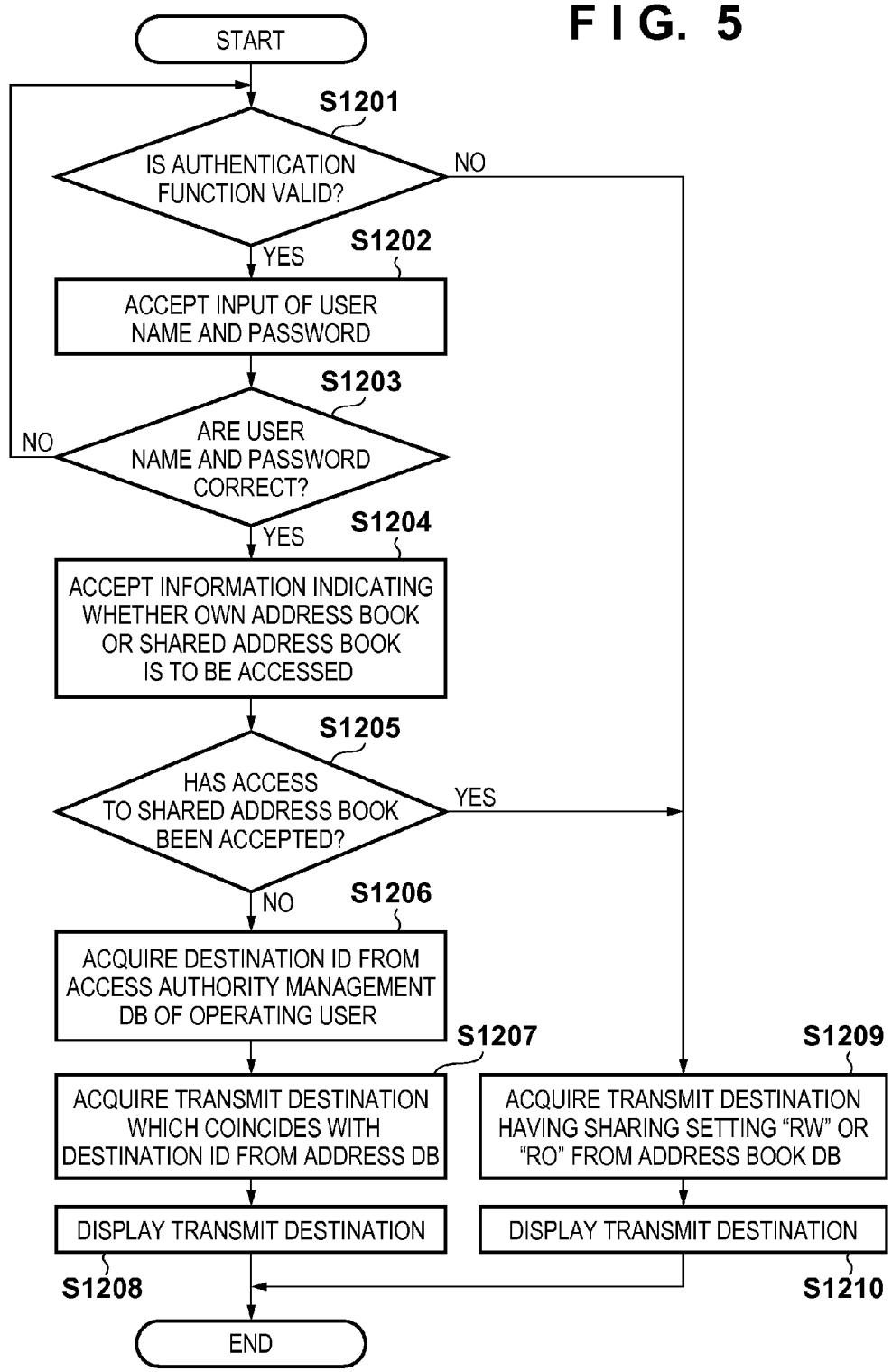
FIG. 5 is a flowchart for explaining a destination display operation by the MFP 110 according to the embodiment.

The operation of a transmit destination display process by the MFP 110 in response to a destination display instruction from the user will be described with reference to FIG. 5. An image transmission process after the transmit destination display process will not be described in detail. Note that the CPU 111 implements the following process by reading out the control program stored in the HDD 113 into the RAM 112, and executing it.

Figure 6:
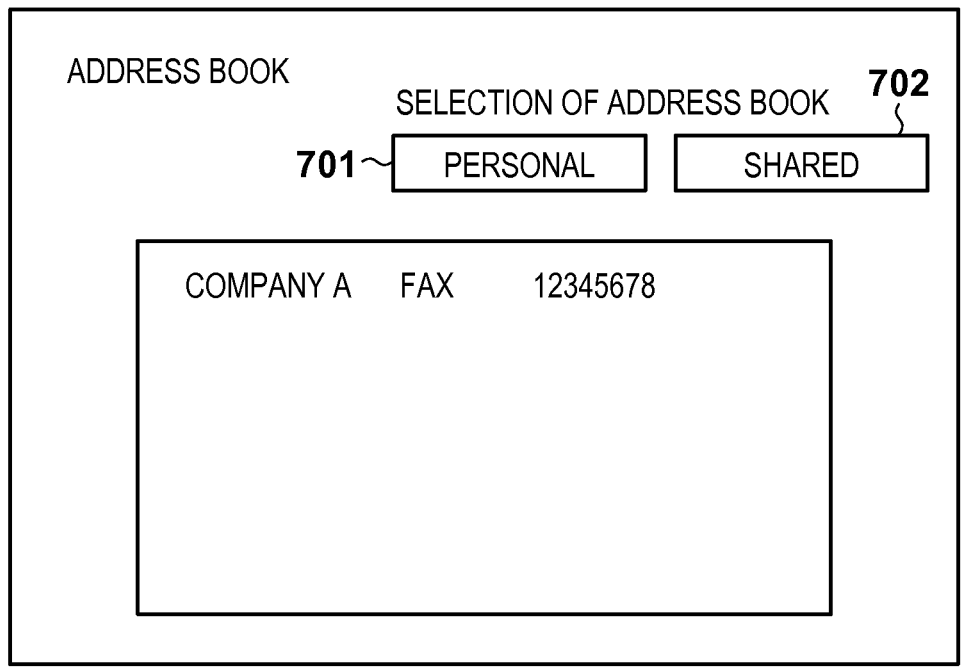
FIG. 6 is a view illustrating an example of an address book personal/shared switching screen on the MFP 110 according to the embodiment.

First, the CPU 111 performs processes in steps S1201 to S1203. These processes are the same as in steps S1101 to S1103, and a description thereof will not be given. If YES is determined in step S1201, the process advances to step S1202. If it is determined in step S1203 that the user name and password input in step S1202 are correct, the process advances to step S1204, in which the CPU 111 accepts from the user command input device 115 information indicating whether a personal address book (first transmit destination group) or a shared address book (second transmit destination group) is to be displayed. FIG. 6 illustrates an example of a screen for prompting the user to select a personal address book and a shared address book. On the screen shown in FIG. 6, display of a personal address book is selected if a button 701 is selected, and display of a shared address book is selected if a button 702 is selected.

When the CPU 111 accepts user input (user instruction) in step S1204, the process advances to step S1205, in which the CPU 111 determines whether it has accepted an instruction to display a shared address book. If YES is determined in step S1205, the process advances to step S1209. On the other hand, if NO is determined in step S1205, the process advances to step S1206, in which the CPU 111 searches the HDD 113 for the access authority management DB of the operating user, and reads out the destination ID stored in the access authority management DB. When the destination ID is read out, the process advances to step S1207, in which the CPU 111 reads out the transmit destination of a record which coincides with the destination ID from the address book DB on the HDD 113. In step S1208, the CPU 111 displays a list of readout transmit destinations on the UI display device 116, and ends the process. The transmit destinations displayed in step S1208 have already been registered in the form of a personal address book for the operating user. In displaying the personal address book, the operating user can specify a destination ID to be displayed by only searching the access management DB of the operating user, thereby speeding up the process.

On the other hand, if NO is determined in step S1201, or YES is determined in step S1205, the CPU 111 reads out a transmit destination other than transmit destinations having sharing setting OFF from the address book DB in step S1209. In step S1210, the CPU 111 displays a list of readout transmit destinations on the UI display device 116. The transmit destinations displayed in step S1210 are included in an address book shared by all users.

<Switching of Authentication Function>

Figure 7:
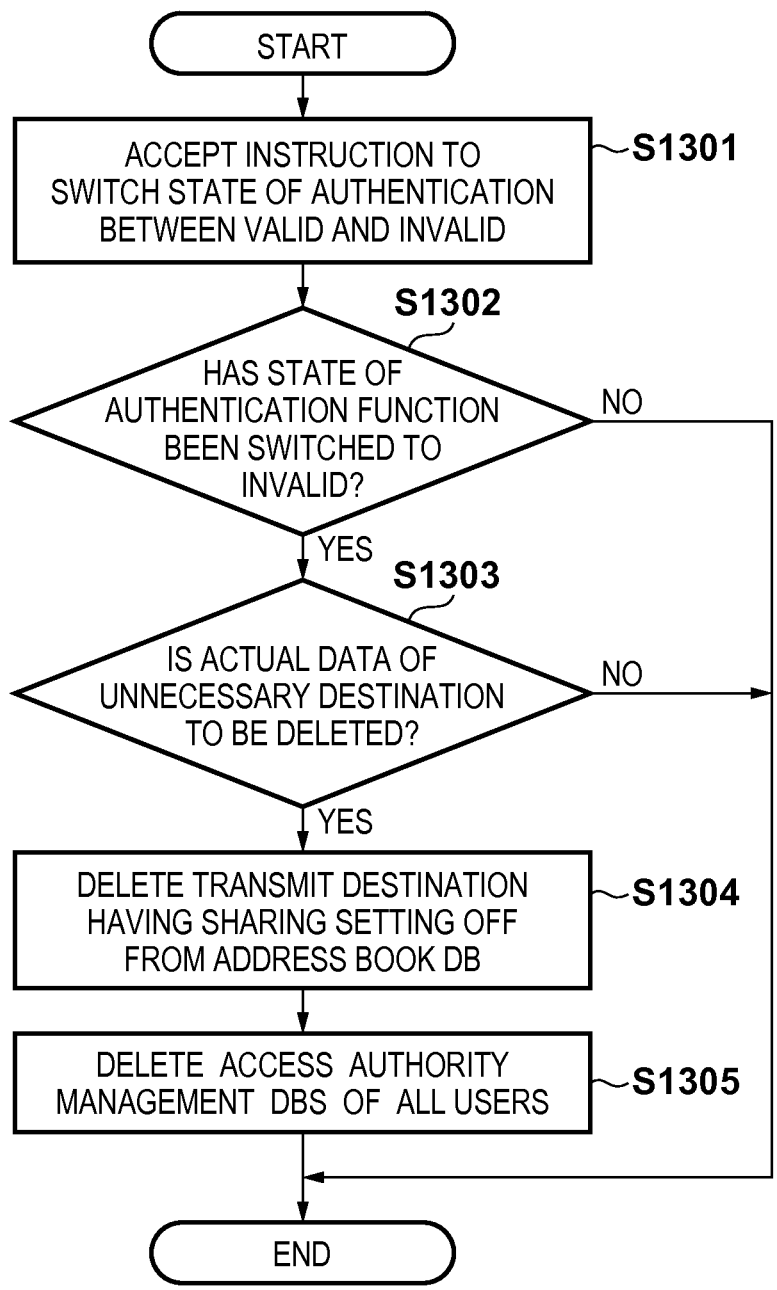
FIG. 7 is a flowchart for explaining an authentication function switching operation by the MFP 110 according to the embodiment.

The process procedure as the user switches the state of the authentication function between valid and invalid will be described with reference to FIG. 7. Note that the CPU 111 implements the following process by reading out the control program stored in the HDD 113 into the RAM 112, and executing it.

In step S1301, the CPU 111 accepts an instruction to switch the state of the authentication function between valid and invalid from the user command input device 115. Only a user with strong authority, such as an equipment manager, may be able to perform an operation of switching the state of the authentication function between valid and invalid. In step S1302, the CPU 111 determines whether the state of the authentication function has been switched to invalid. If NO is determined in step S1302, the process directly ends.

On the other hand, if YES is determined in step S1302, the process advances to step S1303, in which the CPU 111 determines whether actual data of an unnecessary destination is to be deleted. The unnecessary destination means a transmit destination which cannot be displayed while the authentication function is invalid. This determination may be done by displaying information, which indicates whether an unnecessary destination is to be deleted, on the UI display device 116 upon switching, and receiving a value input by the user, or by equipment settings in advance. If NO is determined in step S1303, the process directly ends. Upon validation of the authentication function again, determining NO in step S1303 is advantageous in that the previous data can advantageously be used again, but is disadvantageous in terms of security and disk capacity saving.

On the other hand, if YES is determined in step S1303, the process advances to step S1304, in which the CPU 111 deletes a transmit destination having sharing setting OFF from the address book DB on the HDD 113. In step S1305, the CPU 111 deletes the access authority management DBs of all users from the HDD 113. Upon execution of the deletion processes in steps S1304 and S1305, a transmit destination which is not to be displayed while the authentication function is invalid is deleted, thus making it possible to reduce the amount of data leaked due to security holes and the risk of exceeding the disk capacity.

Figure 8:
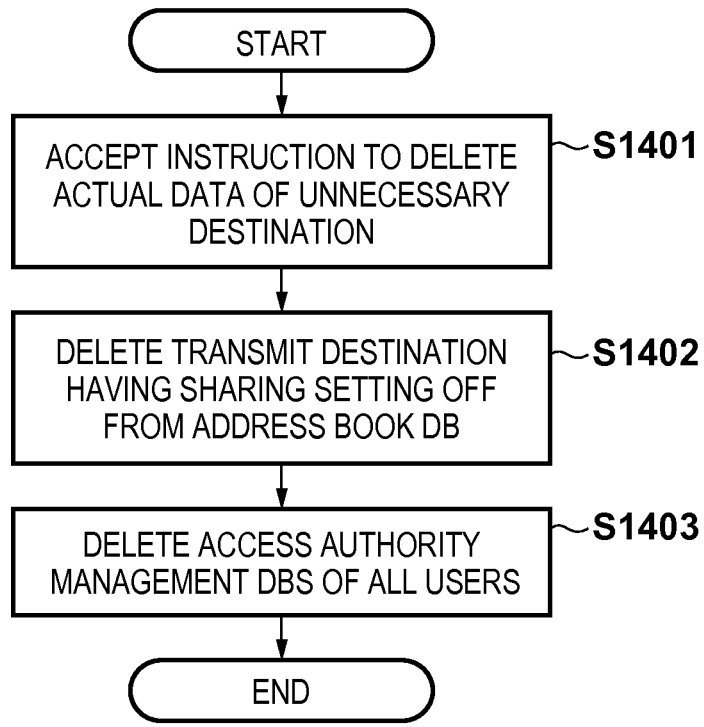
FIG. 8 is a flowchart for an unnecessary destination deletion operation by the MFP 110 according to the embodiment.

The process procedure in deleting actual data of an unnecessary destination later without deletion of the unnecessary destination while the authentication function is invalid, described with reference to FIG. 7, will be described with reference to FIG. 8. Note that the CPU 111 implements the following process by reading out the control program stored in the HDD 113 into the RAM 112, and executing it.

In step S1401, the CPU 111 accepts an instruction to delete actual data of an unnecessary destination from the user command input device 115. In steps S1402 and S1403, a data deletion process is performed. This process is the same as in steps S1304 and S1305, and a description thereof will not be given. This means that deletion of an unnecessary destination while the authentication function is invalid may be done the moment the state of the authentication function is switched to invalid, or be triggered by a user instruction later.

<Editing of Transmit Destination>

Figure 9A:
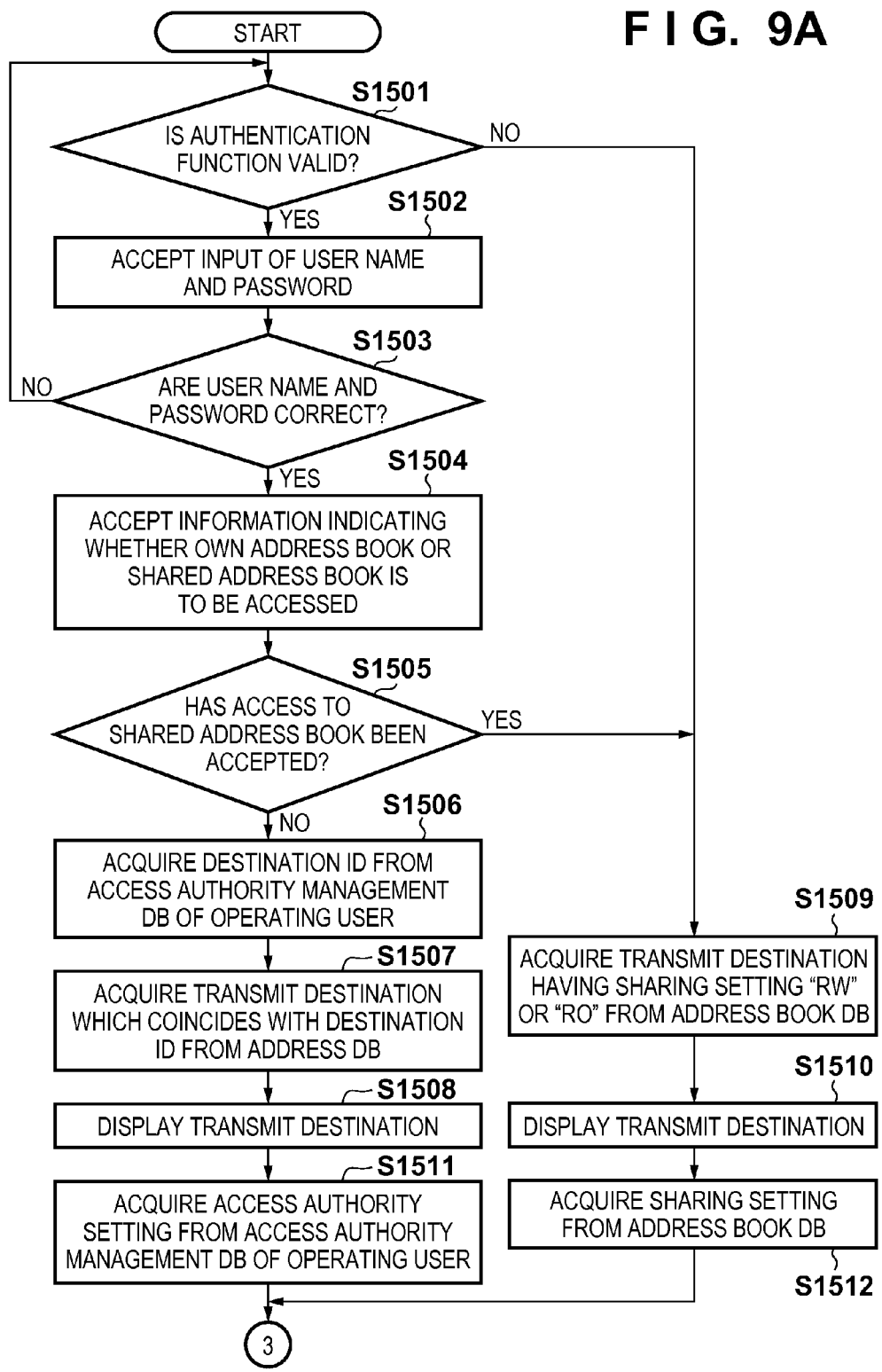
FIGS. 9A and 9B are flowcharts for explaining a destination editing operation by the MFP 110 according to the embodiment.
Figure 9B:
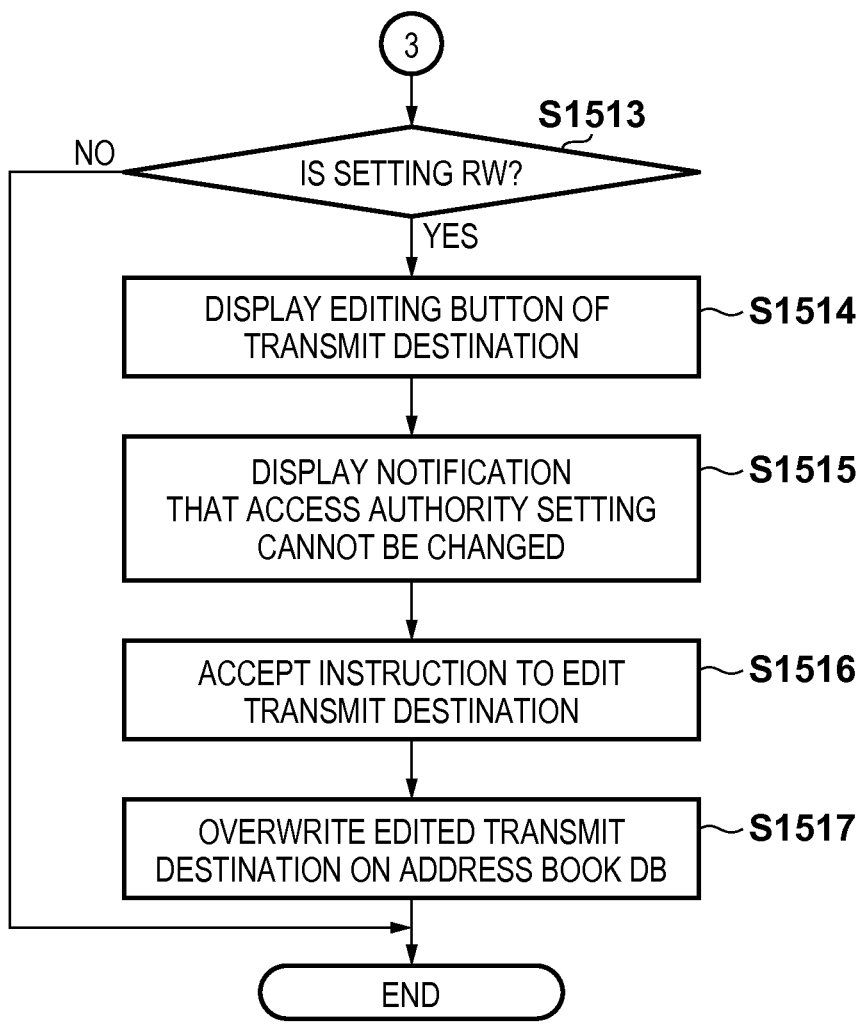

The process procedure in an operation of editing the registered transmit destination will be described with reference to FIGS. 9A and 9B. Note that the CPU 111 implements the following process by reading out the control program stored in the HDD 113 into the RAM 112, and executing it. The following editing operation is performed after a transmit destination is displayed. Since the processes in steps S1501 to S1510 are the same as in steps S1201 to S1210, respectively, of FIG. 5, and are performed before the transmit destinations are displayed, a description thereof will not be given.

After a personal transmit destination of the operating user is displayed in step S1508, in step S1511 the CPU 111 reads out the access authority setting of the displayed transmit destination from the access authority management DB of the operating user. In step S1513, the CPU 111 determines whether the readout access authority setting is RW. On the other hand, after a shared transmit destination is displayed in step S1510, in step S1512 the CPU 111 reads out the sharing setting of the displayed transmit destination from the address book DB. In step S1513, the CPU 111 determines whether the readout sharing setting is RW.

Figure 10:
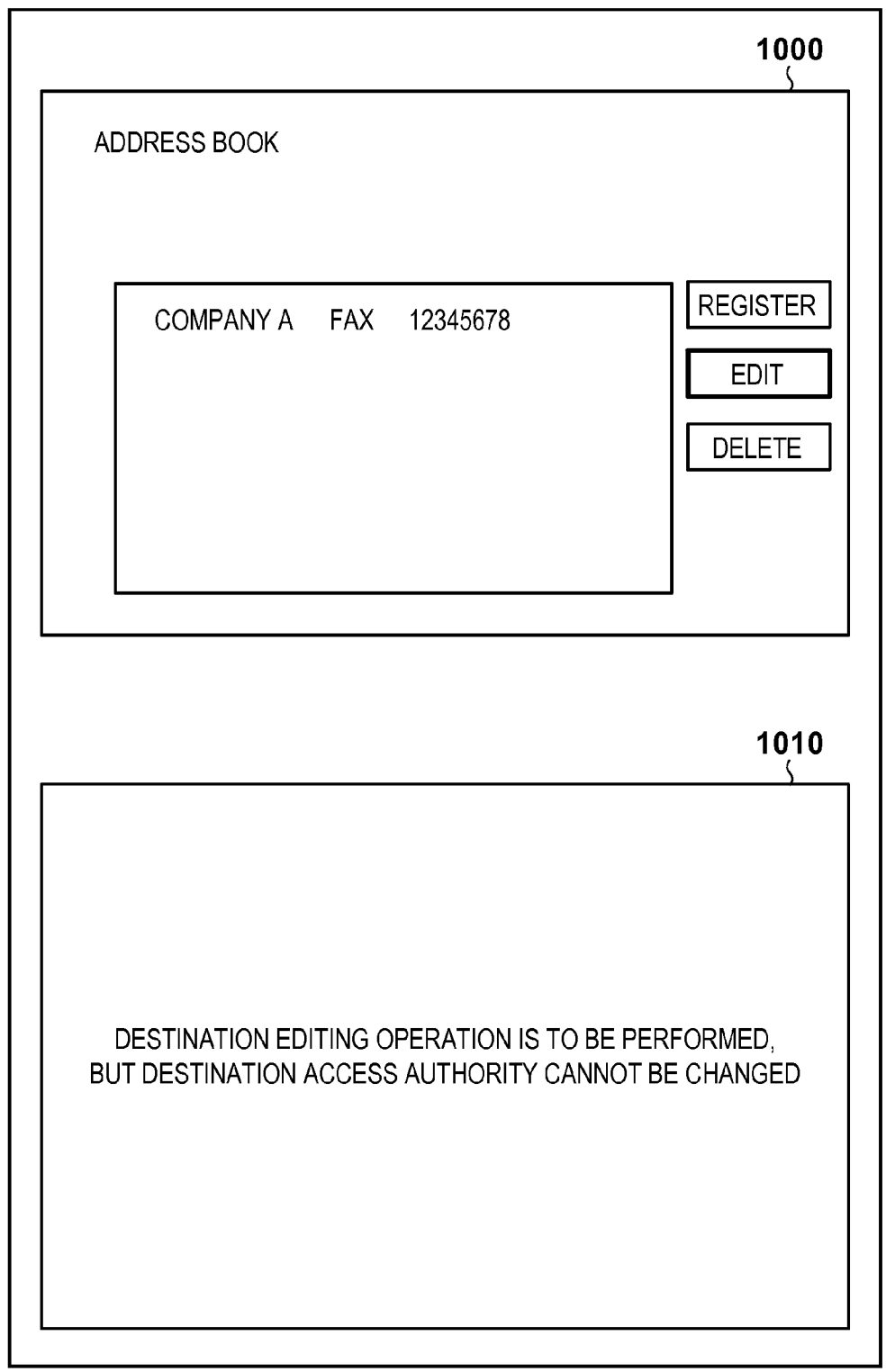
FIG. 10 is a view illustrating an example of a display screen on the MFP 110 according to the embodiment.

If NO is determined in step S1513, the process directly ends. On the other hand, if YES is determined in step S1513, the process advances to step S1514, in which the CPU 111 displays on the UI display device 116 an editing button for performing an operation of editing the transmit destination. In step S1515, the CPU 111 displays on the UI display device 116 a notification that a change in access authority setting or sharing setting is inhibited. Referring to FIG. 10, reference numeral 1000 shows an example of display in step S1514; 1010, an example of display in step S1515. Selecting an edit button on the screen 1000 makes it possible to edit the transmit destination.

In step S1516, the CPU 111 accepts a destination edit instruction and transmit destination information to be updated from the user command input device 115. In step S1517, the CPU 111 overwrites the transmit destination to be edited, based on the input in step S1516, stores it in the address book DB, and ends the process.

<Shortcut Registration Process>

Figure 11:
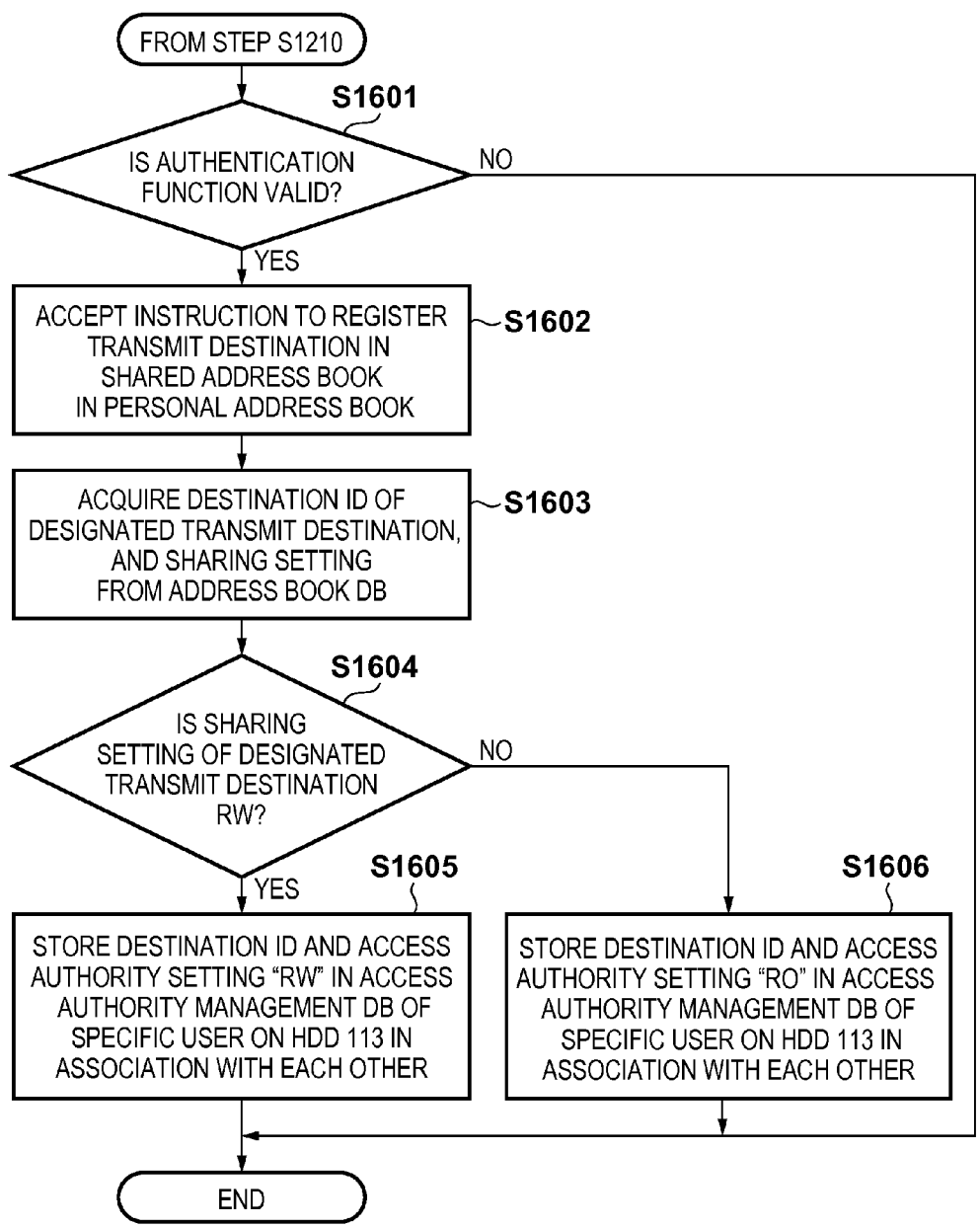
FIG. 11 is a flowchart for explaining a shortcut registration operation by the MFP 110 according to the embodiment.

The process procedure of creating, in a personal address book, a shortcut to a predetermined transmit destination shared by all users will be described with reference to FIG. 11. Note that the CPU 111 implements the following process by reading out the control program stored in the HDD 113 into the RAM 112, and executing it. A shortcut registration process is performed after, for example, a transmit destination shared by all users is displayed. Hence, this process is performed after step S1210 in FIG. 5.

When the transmit destination is displayed in step S1210, the CPU 111 determines in step S1601 whether the authentication function is valid. In this case, it is determined whether a personal address book for which a shortcut is to be created is available. If NO is determined in step S1601, the process directly ends. On the other hand, if YES is determined in step S1601, the process advances to step S1602, in which the CPU 111 accepts from the user command input device 115 an instruction to register a shortcut to the transmit destination in the personal address book. Upon this instruction, the destination ID of the transmit destination for which a shortcut is to be created is designated.

Upon acceptance of the instruction, the process advances to step S1603, in which the CPU 111 reads out the destination ID of the transmit destination designated in step S1602, and the sharing setting from the address book DB. In step S1604, the CPU 111 determines whether the readout sharing setting is RW. If YES is determined in step S1604, the process advances to step S1605, in which the CPU 111 adds the destination ID and access authority setting "RW" to the access authority management DB of the operating user as one record, and stores it. On the other hand, if NO is determined in step S1604, the process advances to step S1606, in which the CPU 111 adds the destination ID and access authority setting "RO" to the access authority management DB of the operating user as one record, and stores it. With these series of processes, a shortcut to the transmit destination can be created in the personal address book of the operating user.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2011-249071 filed on Nov. 14, 2011, which is hereby incorporated by reference herein in its entirety.

What is claimed is:

1. An information processing apparatus comprising:
   a storage unit that stores an address book, wherein the address book includes a plurality of transmit destinations and a user of the information processing apparatus can select the transmit destination of data among the plurality of the transmit destinations included in the address book;
   a managing unit that manages the plurality of transmit destinations stored in the storage unit by classifying the plurality of transmit destinations into a first transmit destination group for a particular user, and a second transmit destination group shared by a plurality of users;
   an authentication unit that authenticates the user;
   a display control unit that allows displaying on a display unit a list of transmit destinations included in a first transmit destination group corresponding to the user authenticated by said authentication unit and a list of transmit destinations included in the second transmit destination group, and allows displaying on the display unit a list of transmit destinations included in the second transmit destination group if an authentication function is invalid; and
   a registration unit that registers a new transmit destination in one of the second transmit destination group and the first transmit destination group corresponding to the user authenticated by said authentication unit if the authentication function is valid, and registers a new transmit destination in the second transmit destination group if the authentication function is invalid.

2. The apparatus according to claim 1, wherein said display control unit displays on the display unit the list of transmit destinations included in the second transmit destination group in accordance with a user instruction, even if the authentication function is valid.

3. The apparatus according to claim 1, wherein said registration unit further registers the new transmit destination in the first transmit destination group corresponding to a specific user other than the user authenticated by said authentication unit as well.

4. The apparatus according to claim 1, wherein said registration unit registers the new transmit destination upon setting editing authority indicating whether the transmit destination is to be made only accessible or made changeable.

5. The apparatus according to claim 4, wherein when the transmit destination stored in the storage unit is set changeable, only information of the transmit destination is changeable, and a change in information indicating whether the transmit destination is included in the first transmit destination group or the second transmit destination group, and a change in the editing authority are inhibited.

6. The apparatus according to claim 1, wherein said managing unit deletes a transmit destination registered as the first transmit destination group from the storage unit in accordance with an instruction from the user.

7. The apparatus according to claim 1, wherein said managing unit adds a predetermined transmit destination included in the second transmit destination group to the first transmit destination group corresponding to the user authenticated by said authentication unit, in accordance with an instruction from the user.

8. An information processing apparatus comprising:
   a storage unit that stores an address book, wherein the address book includes a plurality of transmit destinations and a user of the information processing apparatus can select the transmit destination of data among the plurality of the transmit destinations included in the address book;
   a managing unit that manages the plurality of transmit destinations stored in the storage unit by classifying the plurality of transmit destinations into a first transmit destination group for a particular user, and a second transmit destination group shared by a plurality of users;
   an authentication unit that authenticates the user;
   a display control unit that allows displaying on a display unit a list of transmit destinations included in a first transmit destination group corresponding to the user authenticated by said authentication unit and a list of transmit destinations included in the second transmit destination group, and allows displaying on the display unit a list of transmit destinations included in the second transmit destination group if an authentication function is invalid; and
   registration unit that registers a new transmit destination in one of the second transmit destination group and the first transmit destination group corresponding to the user authenticated by said authentication unit if the authentication function is valid, and registers a new transmit destination in the second transmit destination group if the authentication function is invalid,
   wherein, when a state of the authentication function of the information processing apparatus is switched from valid to invalid, said managing unit deletes a transmit destination registered as the first transmit destination group from the storage unit.

9. A control method for an information processing apparatus, the method comprising:
   causing a managing unit to execute a management step of storing in a storage unit an address book, wherein the address book includes a plurality of transmit destinations and a user of the information processing apparatus can select the transmit destination of data among the plurality of the transmit destinations included in the address book;
   managing, in the managing unit, the plurality of transmit destinations stored in the storage unit by classifying the plurality of transmit destinations into a first transmit destination group for a particular user, and a second transmit destination group shared by a plurality of users;
   causing an authentication unit to execute an authentication step of authenticating the user;
   causing a display control unit to allow displaying on a display unit a list of transmit destinations included in a first transmit destination group corresponding to the user authenticated by the authentication unit and a list of transmit destinations included in the second transmit destination group, and to allow displaying on the display unit a list of transmit destinations included in the second transmit destination group if an authentication function is invalid; and
   registering a new transmit destination in one of the second transmit destination group and the first transmit destination group corresponding to the user authenticated by the authentication unit if the authentication function is valid, and registers a new transmit destination in the second transmit destination group if the authentication function is invalid.

10. A non-transitory computer-readable storage medium storing a computer program for causing a computer to execute each step in a control method for an information processing apparatus defined in claim 9.

11. A control method for an information processing apparatus, comprising:

storing an address book, wherein the address book includes a plurality of transmit destinations and a user of the information processing apparatus can select the transmit destination of data among the plurality of the transmit destinations included in the address book;

managing the plurality of transmit destinations stored in the storage unit by classifying the plurality of transmit destinations into a first transmit destination group for a particular user, and a second transmit destination group shared by a plurality of users;

authenticating the user;

displaying on a display unit a list of transmit destinations included in a first transmit destination group corresponding to the user authenticated by the authenticating and a list of transmit destinations included in the second transmit destination group, and allows displaying on the display unit a list of transmit destinations included in the second transmit destination group if an authentication function is invalid; and registering a new transmit destination in one of the second transmit destination group and the first transmit destination group corresponding to the user authenticated by said authenticating if the authentication function is valid, and registers a new transmit destination in the second transmit destination group if the authentication function is invalid, wherein, when a state of the authentication function of the information processing apparatus is switched from valid to invalid, said managing a transmit destination registered as the first transmit destination group from the storing.

12. A storage medium storing a program for a control method for an information processing apparatus, the method comprising:

storing an address book, wherein the address book includes a plurality of transmit destinations and a user of the information processing apparatus can select the transmit destination of data among the plurality of the transmit destinations included in the address book;

managing the plurality of transmit destinations stored in the storage unit by classifying the plurality of transmit destinations into a first transmit destination group for a particular user, and a second transmit destination group shared by a plurality of users;

authenticating the user;

displaying on a display unit a list of transmit destinations included in a first transmit destination group corresponding to the user authenticated by the authenticating and a list of transmit destinations included in the second transmit destination group, and allows displaying on the display unit a list of transmit destinations included in the second transmit destination group if an authentication function is invalid; and registering a new transmit destination in one of the second transmit destination group and the first transmit destination group corresponding to the user authenticated by said authenticating if the authentication function is valid, and registers a new transmit destination in the second transmit destination group if the authentication function is invalid, wherein, when a state of the authentication function of the information processing apparatus is switched from valid to invalid, said managing a transmit destination registered as the first transmit destination group from the storing.

* * * * *